United States Patent
Spandl

(10) Patent No.: US 7,484,844 B2
(45) Date of Patent: Feb. 3, 2009

(54) HINGE FOR SPECTACLES

(75) Inventor: Ernst Spandl, Knittlingen (DE)

(73) Assignee: CCS ROYAL Brillenmode GmbH, Chemnitz (DE)

( * ) Notice: Subject to any disclaimer, the term of this patent is extended or adjusted under 35 U.S.C. 154(b) by 0 days.

(21) Appl. No.: 11/919,839

(22) PCT Filed: May 3, 2006

(86) PCT No.: PCT/EP2006/004132

§ 371 (c)(1),
(2), (4) Date: Nov. 2, 2007

(87) PCT Pub. No.: WO2006/117206

PCT Pub. Date: Nov. 9, 2006

(65) Prior Publication Data

US 2008/0204652 A1    Aug. 28, 2008

(30) Foreign Application Priority Data

May 4, 2005    (DE) .................. 10 2005 020 891

(51) Int. Cl.
    *G02C 5/22* (2006.01)
(52) U.S. Cl. ......................... 351/153; 16/228
(58) Field of Classification Search ............... 351/153, 351/140, 116, 111, 41, 158; 16/228
    See application file for complete search history.

(56) References Cited

U.S. PATENT DOCUMENTS

| 4,153,347 | A |   | 5/1979  | Myer ..................... 351/90 |
| 5,418,581 | A | * | 5/1995  | Conway .................. 351/116 |
| 5,570,492 | A | * | 11/1996 | Nakanishi ................. 16/228 |
| 6,260,965 | B1 | * | 7/2001 | Kroman et al. ............ 351/153 |
| 6,357,874 | B1 |   | 3/2002 | Miyazawa ................. 351/153 |
| 7,121,663 | B1 | * | 10/2006 | Huang .................... 351/153 |
| 7,338,157 | B1 | * | 3/2008 | Leung ..................... 351/153 |
| 2007/0211210 | A1 |   | 9/2007 | Proksch .................. 351/121 |

FOREIGN PATENT DOCUMENTS

DE    4241660    6/1993

(Continued)

OTHER PUBLICATIONS

International Search Report for International App. No. PCT/EP2006/004132, Jul. 27, 2006.

(Continued)

*Primary Examiner*—Hung X Dang
(74) *Attorney, Agent, or Firm*—Kusner & Jaffe

(57) ABSTRACT

The present invention relates to a hinge for spectacles, the hinge having two spectacle frame parts joined in an articulated manner by an axis element, the end of the first spectacle frame part having a first bend which encloses at least in part the axis element in a pivoting manner, and the second spectacle frame part being secured against rotation to the axis element. Also disclosed is a spectacle frame having this type of hinge. The claimed hinge for spectacles is characterised in that an elastic tongue is formed in the second spectacle frame part, on the side of the hinge, having a second bend which encloses at least in part the first bend of the first spectacle frame part.

16 Claims, 1 Drawing Sheet

FOREIGN PATENT DOCUMENTS

| | | |
|---|---|---|
| DE | 29806144 | 6/1998 |
| DE | 29820649 | 4/1999 |
| DE | 29724432 | 6/2001 |
| DE | 20105796 | 8/2001 |
| DE | 10159324 | 6/2003 |
| DE | 202004007224 | 7/2004 |
| EP | 0863424 | 9/1998 |
| EP | 0973056 | 1/2000 |
| FR | 2703477 | 10/1994 |
| FR | 2795529 | 12/2000 |
| FR | 2815728 | 4/2002 |
| WO | WO2005/040892 | 5/2005 |

OTHER PUBLICATIONS

International Preliminary Report on Patentability for International App. No. PCT/EP2006/004132 (English translation).

* cited by examiner

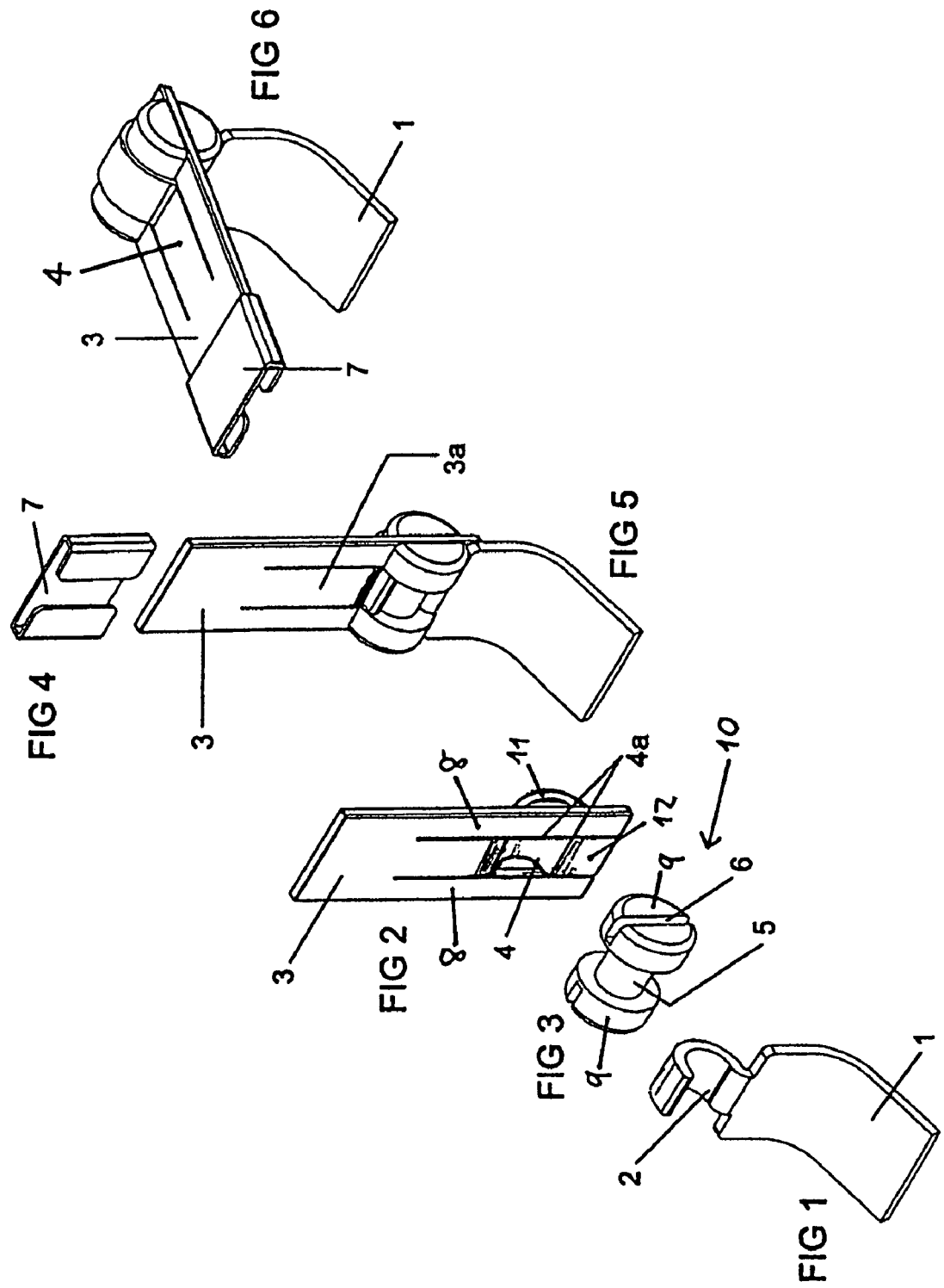

HINGE FOR SPECTACLES

The present invention relates to a hinge for spectacles, with two spectacle frame parts which are connected to each other in an articulated manner via a spindle element, wherein the end of the first spectacle frame part has a first bend which encloses at least part of the spindle element in a pivotable manner, and rotationally fixed manner with the spindle element. Furthermore, the invention relates to a spectacle frame with a hinge of this type.

Spectacle frames usually have a frame into which two spectacle lenses can be inserted. "Cheek parts", to the ends of which a respective spectacle arm is fastened via a hinge, are formed on the two outer sides of the frame. Furthermore, "frameless spectacles" are known, in which the cheek parts are fastened directly to the outer sides of the lenses. The inner sides of the lenses are then connected to each other via a web.

The hinge for spectacles usually has a screw connection which connects the spectacle arm to the cheek part. The movement of the spectacle arm is adjusted by tightening the screw to a greater or lesser extent. The screw connection can therefore be used to set the torque required in order to pivot the spectacle arm against the cheek part. A disadvantage of hinges for spectacles with screw connections is that the ease of movement of the hinge changes due to frequent pivoting of the spectacle arm. The screw connection therefore has to be frequently retightened. In addition, screw connections are disadvantageous from an aesthetic aspect.

Furthermore, "screwless hinges for spectacles" are known. DE 20 2004 007 224 U1 describes an example of a hinge which is formed from a cheek end, the end of the spectacle arm and a hinge pin element. The end of the spectacle arm has a cylinder shell which bears against a cylindrical section of the hinge pin element. Furthermore, the end of the spectacle arm has a flexible tongue which interacts with the cheek end. The cheek end is connected fixedly and nonrotatably to the hinge pin element. When the spectacle arm is pivoted, the partial cylinder shell of the spectacle arm rotates on the hinge pin element, with the flexible tongue ensuring that the arm cannot become detached from the cheek end or the hinge pin element.

Further screwless hinges for spectacles are known from DE 298 20 649 U1, DE 298 06 144 U1, DE 297 24 432 U1, DE 201 05 796 U1 and DE 101 59 324 A1.

A first disadvantage of known screwless hinges for spectacles is that the connection between the cheek part, i.e. the front part of the spectacles, and the arm is frequently unstable, and the second disadvantage is that they are frequently unsuitable from an aesthetic aspect.

It is the object of the present invention to provide a hinge for spectacles of the type mentioned at the beginning, which produces a stable connection between the two spectacle frame parts. Furthermore, the hinge for spectacles is to have a compact and aesthetically attractive construction. Furthermore, a spectacle frame with a hinge of this type is to be provided.

This object is achieved according to the invention by a hinge for spectacles with the features of claim 1 and a spectacle frame with the features of claim 15. Advantageous improvements and developments emerge from the subclaims.

The hinge for spectacles according to the invention is characterized in that a flexible tongue is formed on the hinge side in the second spectacle frame part and has a second bend which encloses at least part of the first bend of the first spectacle frame part. The bend of the first spectacle frame part is therefore arranged between the spindle element and the bend of the flexible tongue of the second spectacle frame part.

By this means, a stable and at the same time very compact connection between the two spectacle frame parts can be achieved by means of the spindle element, as a result of which an attractive appearance is also obtained.

According to a preferred refinement of the hinge for spectacles according to the invention, the flexible tongue is formed by two incisions in the longitudinal direction at the end of the second spectacle frame part. In this case, two side strips which are connected to the spindle element can remain laterally next to the flexible tongue. The spindle element can have, in particular, two end-side slots in which the side strips engage. In this case, a rotationally fixed, releasable connection is therefore produced between the second spectacle frame part and the spindle element. However, it would also be conceivable for the spindle element to be formed integrally with the second spectacle frame part. In addition, it would be possible to form two flexible tongues on the outside, which are arranged next to a central strip which is connected to the spindle element.

According to a further preferred refinement, the spindle element is dumbbell-shaped, the first bend and/or the second bend bearing laterally against the inner surfaces of the dumbbell ends. In this manner, the bends of the two spectacle frame parts can be held in the spindle direction by the dumbbell ends.

According to a further preferred refinement, the spindle element comprises a cylinder bolt. In this case, at least one section of the first bend is a first partial hollow cylinder, the inside diameter of which corresponds to the outside diameter of the bolt. The cross section of the partial hollow cylinder can be, for example, a semicircle or a three-quarter circle. In this case, the bend is therefore semicircular or three-quarters circular.

Furthermore, at least one section of the second bend can also be a partial hollow cylinder, the inside diameter of which corresponds to the outside diameter of the partial hollow cylinder of the first bend. This partial hollow cylinder of the second bend can also form a semicircle or a three-quarter circle in cross section. In the assembled state of the hinge for spectacles, the partial hollow cylinder of the first bend therefore encloses the cylinder bolt of the spindle element in a form-fitting manner, and the partial hollow cylinder of the second bend encloses the partial hollow cylinder of the first bend in a form-fitting manner.

Finally, the end of the second spectacle frame part preferably strikes against the first spectacle frame part when the hinge is open, as a result of which the pivoting angle of the hinge is limited. The end of the flexible tongue particularly preferably strikes against the first spectacle frame part, when the hinge is open.

According to a further preferred refinement of the hinge for spectacles according to the invention, a sliding part which is held displaceably in a form-fitting manner on the second spectacle frame part is provided and can overlap the flexible tongue to differing extents such that the force which is exerted on the first bend by the flexible tongue can be changed. Movement of the hinge can therefore be adjusted by the sliding part. The sliding part namely enables the friction which occurs during the pivoting of the first spectacle frame part to be changed, since the surfaces of the first bend rub firstly against the spindle element and secondly against the second bend of the second spectacle frame part. For example, the flexible tongue can protrude on one side over the surface of the side strips in a manner rising toward the hinge, and the sliding part can bear on the other side against the opposite surface of the side strips and, upon displacement toward the hinge, can press against the protruding surface of the flexible tongue.

The first and/or the second spectacle frame part is/are preferably formed from a flat material, in particular sheet metal. Stainless steel or titanium sheet is particularly preferred. Sheet-metal parts of this type can advantageously be produced very cost-effectively. At the same time, they impart a highly filigree appearance to a spectacle frame.

The first spectacle frame part is, in particular, the cheek part of a spectacle frame, and the second spectacle frame part is the hinge-side end of a spectacle arm.

The spectacle frame according to the invention comprises a device for fastening two spectacle lenses, cheek parts formed on both sides of the fastening device, and a respective spectacle arm, the spectacle arms being connected to the cheek parts via a respective hinge according to the invention. The fastening device can be, in particular, a frame for holding spectacle lenses. This frame can preferably be formed integrally with the cheek parts.

The invention is now explained using an exemplary embodiment and with reference to the drawings:

FIG. 1 shows the cheek part of an exemplary embodiment of the hinge for spectacles according to the invention, FIG. 2 shows the arm part of the exemplary embodiment of the hinge for spectacles according to the invention, FIG. 3 shows the spindle element of the exemplary embodiment of the hinge for spectacles according to the invention, FIG. 4 shows the sliding part of the exemplary embodiment of the hinge for spectacles according to the invention, FIG. 5 shows the exemplary embodiment of the hinge for spectacles according to the invention in the assembled, unfolded state, but without the sliding part fitted, and FIG. 6 shows the exemplary embodiment of the hinge for spectacles according to the invention in the assembled, folded-in state with the sliding part fitted.

In the case of the hinge for spectacles, two spectacle frame parts are connected to each other in an articulated manner via a spindle element 10. The first spectacle frame part is the cheek part 1 of a spectacle frame, and the spectacle frame part is an arm part 3 of a spectacle frame. The arm part 3 can be the end of the spectacle arm, i.e. it can be formed integrally with the spectacle arm. Furthermore, the arm part 3 could also be connected to the spectacle arm.

As can be seen in FIG. 1, the cheek part 1 has a bend 2 at its arm-side or hinge-side end. The width of the bend 2 is smaller than the width of the remaining cheek part 1. The bend 2 extends from the end surface of the remaining cheek part 1, with it merging after a transition region from the remaining cheek part 1 into a partial hollow cylinder. The cross section of the partial hollow cylinder forms a semicircle. However, other circular sections would also be conceivable.

FIG. 2 shows the arm part 3. The end of the arm part 3 has two incisions 4a or slots in the longitudinal direction, starting from the hinge-side end surface. The incisions 4a form a flexible tongue 4 in the center of the end of the arm part 3 and two side strips 8 laterally next to the flexible tongue 4. The surface of the flexible tongue 4 initially runs flush with the surfaces of the side strips 8, then rises into a bend 11 and finally ends in an end section 12 which is again flush with the surfaces of the side strips 8.

After a transition region, the bend 11 also forms a partial hollow cylinder with an essentially semicircular cross section. Other circular sections can also be realized for this bend 11.

FIG. 3 shows the spindle element 10. It is in the form of a dumbbell with two dumbbell ends 9 and a cylinder bolt 5 in the center. The diameter of the dumbbell ends 9 is larger than that of the cylinder bolt 5. The end sides of the dumbbell ends 9 each have a slot 6. The width of the slot 6 corresponds to the material thickness of the side strips 8 of the arm part 3 or to the material thickness of the entire spectacle arm. The diameter of the cylinder bolt 5 corresponds to the inside diameter of the partial hollow cylinder of the bend 2 of the cheek part 1. Furthermore, the outside diameter of the partial hollow cylinder of the bend 2 of the cheek part 1 corresponds to the inside diameter of the bend 11 of the flexible tongue 4 of the arm part 3.

During assembly of the hinge for spectacles, the bend 2 of the cheek part 1 is placed on to the cylinder bolt 5 of the spindle element 10 in such a manner that the bend 2 encloses the spindle element. The width of the bend 2 corresponds to the recess of the spindle formed by the cylinder bolt 5, and therefore the bend 2 bears laterally against the inner surfaces of the dumbbell ends 9. The bend 2 is therefore held in the spindle direction by the dumbbell ends 9.

The arm part 3 is then placed on. For this purpose, the flexible tongue 4 is raised resiliently in the direction of the bend 11. The side strips 8 are then introduced into the slots 6 of the spindle element 10 until the bend 11 is located in the region of the cylinder bolt 5 which is enclosed by the bend 2 of the cheek part 1. The side strips 8 therefore engage in the slots 6 and connect the arm part 3 in a rotationally fixed manner to the spindle element 10. The flexible tongue 4 is finally released such that the bend 11 encloses the bend 2, with the inner surface of the bend 11 pressing against the outer surface of the bend 2. The bend 11 of the flexible tongue 4 therefore secures the arm part 3. It can only be released by the cheek part 1 and the spindle element 10 counter to the spring force of the flexible tongue 4. Furthermore, the width of the flexible tongue 4 corresponds to the width of the bend 2 and therefore also to the recess of the spindle formed by the cylinder bolt 5. The difference in the diameters of the dumbbell ends 9 and the cylinder bolt 5 corresponds essentially to the material thicknesses of the bends 2 and 11. The bend 11 therefore also bears against the inner surfaces of the dumbbell ends 9. However, this is not absolutely required, since the arm part 3 is already held in the spindle direction by the side strips 8 which are in engagement with the slots 6 of the dumbbell ends 9. The assembled hinge for spectacles is shown in FIG. 5.

The opening angle of the hinge for spectacles is limited in that, when the spectacles are open, i.e. in the unfolded state of the hinge as shown in FIG. 5, the end section 12 of the flexible tongue 4 strikes against the cheek part 1.

The ease of movement of the hinge for spectacles is determined by the frictional force which arises during pivoting of the arm part 3 with the spindle element 10 in relation to the cheek part 1. The frictional forces are determined by the sliding surfaces firstly between the inner surface of the bend 2 and the outer surface of the cylinder bolt 5 and secondly between the outer surface of the bend 2 and the inner surface of the bend 11. Furthermore, the frictional forces are dependent on the force which the flexible tongue 4 exerts on the bend 2, i.e. on how strongly the bend 11 presses the bend 2 in the radial direction against the cylinder bolt 5.

The cheek part 1 and the arm part 3 are manufactured from a flat material, such as sheet metal, in particular a stainless steel sheet or a titanium sheet. In this case, the shape of the cheek part 1 with the bend 2 and of the arm part 3 with the bend 11 in the flexible tongue 4 is achieved by bending tools. The hinge can therefore be produced without screws, solderings or the like.

In a development according to the invention of the hinge for spectacles, the movement of the hinge for spectacles is adjusted by a sliding part 7. This sliding part is shown in FIG. 4. It is composed of a flat material, the ends of which are bent over at 180° C. The internal dimensions of the sliding part correspond to the external dimensions of the sheet metal of the arm part 3. The sliding part 7 can therefore be pushed over the arm part 3 and enclose it fixedly in a form-fitting manner. This state is shown in FIG. 6 which shows the above-described hinge for spectacles in the folded-in state, i.e. with the spectacles closed.

In the position of the sliding part 7 that is shown in FIG. 6, the sliding part 7 does not have any effect on the ease of movement of the hinge. However, the sliding part 7 can be displaced on the arm part 3 in the direction of the hinge until it overlaps the flexible tongue 4 to differing extents. The spring action of the flexible tongue 4 can be changed depending on how far the hinge-side edge of the sliding part 7 is pushed over the end of the incisions 4a. The further the sliding part 7 is pushed in the direction of the hinge, the more difficult is the movement of the hinge. This can also be achieved, in particular, by the flexible tongue or a projection fitted on the flexible tongue protruding over the upper sides (shown in FIG. 6) of the side strips 8 in a manner rising toward the hinge. The bent-over ends of the sliding part 7 bear against the opposite, lower surfaces of the side strips 8. If the sliding part is now displaced toward the hinge against the protruding part of the flexible tongue 4, the flexible tongue 4 is pressed by the sliding part 7 toward the cylinder bolt 5. Since the bend 2 of the cheek part 1 is located between the cylinder bolt 5 and the bend 11 of the flexible tongue 4, the friction during the pivoting of the arm part 3 can therefore be increased or reduced by displacement of the sliding part 7. The ease of movement of the hinge for spectacles can therefore be set by the sliding part 7.

Like the other hinge parts, the sliding part 7 can be manufactured from sheet metal, in particular from stainless steel or titanium sheet. However, it can also be composed of a plastic.

The spectacles according to the invention have a device for fastening two spectacle lenses. This fastening device is, in particular, a frame made of sheet metal. The two spectacle lenses can be inserted into this frame. In order to avoid that a groove has to be milled in a complex manner into the spectacle lenses in order to insert them into the sheet-metal frame, the sheet-metal frame has, on the rear side, i.e. on the side facing the wearer, a respective extension which makes it possible to fasten the spectacle lenses in a conventional manner, i.e. without milling a groove around the entire circumference. In this case, it is not required for the extensions to run around the entire edge of the opening for the respective spectacle lens. It suffices if the extension is provided in a partial section of the openings for the spectacle lenses.

The cheek parts, the ends of which are illustrated in FIG. 1, are each formed on the outside of the sheet-metal frame. The cheek parts are formed integrally with the frame, i.e. the frame and the cheek parts 1 can be bent from sheet metal. The two spectacle arms are also manufactured from sheet metal. The ends of the spectacle arms are the arm parts 3 which are shown in FIG. 2. The spectacle arms are connected to the cheek parts of the spectacle frame via a hinge for spectacles as has been described above. The entire spectacle frame therefore has a total of only five parts, namely the spectacle frame which comprises the two cheek parts 1, the two spectacle arms and a respective spindle element 10.

The invention claimed is:

1. A hinge for spectacles, with first and second spectacle frame parts (1, 3) which are connected to each other in an articulated manner via a spindle element (10), wherein
    an end of the first spectacle frame part (1) has a first bend (2) which encloses at least part of the spindle element (10) in a pivotable manner, and
    the second spectacle frame part (3) is formed in a rotationally fixed manner with the spindle element (10),
    wherein
    a flexible tongue (4) is formed on the hinge side in the second spectacle frame part (3) and has a second bend (11), wherein the second bend (11) of the flexible tongue (4) encloses at least part of the first bend (2) of the first spectacle frame part (1), and wherein the flexible tongue (4) is formed by two incisions (4a) in the longitudinal direction at an end of the second spectacle frame part (3).

2. The hinge for spectacles as claimed in claim 1, characterized in that two side strips (8) which are connected to the spindle element (10) remain laterally next to the flexible tongue (4).

3. The hinge for spectacles as claimed in claim 2, characterized in that the spindle element (10) has two end-side slots (6) in which the side strips (8) engage.

4. The hinge for spectacles as claimed in claim 1, characterized in that the spindle element (10) is dumbbell-shaped, and in that the first bend (2) and/or the second bend (11) bears/bear laterally against the inner surfaces of dumbbell ends (9).

5. The hinge for spectacles as claimed in claim 1, characterized in that the spindle element (10) comprises a cylinder bolt (5), in that at least one section of the first bend (2) is a first partial hollow cylinder, the inside diameter of which corresponds to the outside diameter of the cylinder bolt (5).

6. The hinge for spectacles as claimed in claim 5, characterized in that at least one section of the second bend (11) is a second partial hollow cylinder, the inside diameter of which corresponds to the outside diameter of the first partial hollow cylinder.

7. The hinge for spectacles as claimed in claim 1, characterized in that an end (12) of the second spectacle frame part (3) strikes against the first spectacle frame part (1) when the hinge is open, as a result of which the pivoting angle of the hinge is limited.

8. The hinge for spectacles as claimed in claim 7, characterized in that the end (12) of the flexible tongue (4) strikes against the first spectacle frame part (1) when the hinge is open.

9. The hinge for spectacles as claimed in claim 1, characterized in that a sliding part (7) which is held displaceably in a form-fitting manner on the second spectacle frame part (3) is provided and can overlap the flexible tongue (4) to differing extents such that the force which is exerted on the first bend (2) by the flexible tongue (4) can be changed.

10. The hinge for spectacles as claimed in claim 9, characterized in that the flexible tongue (4) protrudes on one side over the surface of side strips (8) in a manner rising toward the hinge, and in that the sliding part (7) bears on the other side against the opposite surface of the side strips (8) and, upon displacement toward the hinge axis, presses against the protruding surface of the flexible tongue (4).

11. The hinge for spectacles as claimed in claim 1, characterized in that the first and/or the second spectacle frame part (1, 3) is/are formed from a flat material.

12. A hinge for spectacles as claimed in claim 1, characterized in that the first and/or the second spectacle frame part (1, 3) is/are formed from sheet metal.

13. A hinge for spectacles as claimed in claim 1, characterized in that the first spectacle frame part is a cheek part (1) of a spectacle frame, and the second spectacle frame part is a hinge-side end of a spectacle arm (3).

14. A spectacle frame with a device for fastening two spectacle lenses, cheek parts (1) formed on both sides of the fastening device, and a respective spectacle arm (3), characterized in that the spectacle arms (3) are connected to the cheek parts (1) via a respective hinge comprising:

a spindle element (10), wherein an end of the cheek part (1) has a first bend (2) which encloses at least part of the spindle element (10) in a pivotable manner, and the spectacle arm (3) is formed in a rotationally fixed manner with the spindle element (10), wherein a flexible tongue (4) is formed on the hinge side in the spectacle arm (3) and has a second bend (11), wherein the second bend (11) of the flexible tongue (4) encloses at least part of the first bend (2) of the cheek part (1), and wherein the flexible tongue (4) is formed by two incisions (4*a*) in the longitudinal direction at an end of the spectacle arm (3).

15. The spectacle frame as claimed in claim 14, characterized in that the fastening device is a frame for holding spectacle lenses.

16. The spectacle frame as claimed in claim 15, characterized in that the frame and the cheek parts (1) are formed integrally.

* * * * *